(12) United States Patent
Wernersson et al.

(10) Patent No.: US 8,831,125 B2
(45) Date of Patent: Sep. 9, 2014

(54) DATA TRANSMISSION IN A MULTIPLE ANTENNA SYSTEM

(75) Inventors: Niklas Wernersson, Solna (SE); David Hammarwall, Vallentuna (SE); Svante Bergman, Hägersten (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 192 days.

(21) Appl. No.: 13/520,294

(22) PCT Filed: Jun. 8, 2012

(86) PCT No.: PCT/SE2012/050623
§ 371 (c)(1),
(2), (4) Date: Jul. 2, 2012

(87) PCT Pub. No.: WO2013/133744
PCT Pub. Date: Sep. 12, 2013

(65) Prior Publication Data
US 2013/0329772 A1    Dec. 12, 2013

Related U.S. Application Data

(60) Provisional application No. 61/607,310, filed on Mar. 6, 2012.

(51) Int. Cl.
*H04B 7/02* (2006.01)
(52) U.S. Cl.
USPC ........... 375/267; 375/252; 375/247; 375/244; 375/242; 375/260; 375/295; 375/316
(58) Field of Classification Search
USPC .......... 375/252, 247, 244, 242, 260, 295, 316
See application file for complete search history.

(56) References Cited

U.S. PATENT DOCUMENTS

| 2010/0238824 A1* | 9/2010 | Farajidana et al. | 370/252 |
| 2012/0129566 A1* | 5/2012 | Lee et al. | 455/522 |
| 2013/0272151 A1* | 10/2013 | Thomas et al. | 370/252 |

OTHER PUBLICATIONS

Wang, et al., "Power Offset Compensation Schemes Between CRS and DRS for Downlink Dual Layer Beamforming in LTE System," Communications and Networking in China, 2010 $5^{th}$ International ICST Conference, IEEE, pp. 1-4, Aug. 25, 2010.
Huawei et al., "Beamforming enhancement in LTE-Advanced," 3GPP Draft; R1-084521, $3^{rd}$ Generation Partnership Project (3GPP), Mobile Competence Centre; Nov. 18, 2008.
International Search Report issued in Application No. PCT/SE2012/050623 dated Sep. 3, 2012.

(Continued)

*Primary Examiner* — Zewdu Kassa
(74) *Attorney, Agent, or Firm* — Baker Botts L.L.P.

(57) ABSTRACT

Some of the example embodiments presented herein are directed towards an eNodeB (401), and corresponding method therein, for providing data transmission in a multiple antenna system. The eNodeB (401) may be configured to receive a plurality of signal quality assessments and a CSI report from a user equipment. Based on the received data the eNodeB (401) may determine a received power difference between the received data. The eNodeB (401) may further determine a beamforming direction for subsequent data transmissions. Based on the power difference, the eNodeB (401) may account for the received power difference in the subsequent data transmissions, thus improving data communications towards the user equipment.

22 Claims, 8 Drawing Sheets

(56) References Cited

OTHER PUBLICATIONS

Written Opinion of the International Preliminary Examining Authority, mailed Feb. 7, 2014 in International Application No. PCT/SE2012/050623.
PCT International Search Report and Written Opinion for International Application No. PCT/SE2012/050623, Sep. 3, 2012.
Lilei Wang et al.: "Power offset compensation schemes between CRS and DRS for downlink dual layer beaforming in LTE system", Communications and Networking in China (Chinacom), 2010 5th International ICST Conference on, IEEE, Piscataway, NJ, Aug. 25, 2010.
Huawei et al.: "Beamforming enhancement in LTE-Advanced", 3GPP TSG RAN WG1 meeting #55; R1-084521, Nov. 10-14, 2008.
Written Opinion of the International Preliminary Examining Authority for International Application No. PCT/SE2012/050623, Feb. 7, 2014.
3GPP TS 36.216 V10.4.0, "Evolved Universal Terrestrial Radio Access (E-UTRA); Physical layer procedures", 2012.

* cited by examiner

DATA TRANSMISSION IN A MULTIPLE ANTENNA SYSTEM

This application is the U.S. national phase of International Application No. PCT/SE2012/050623, filed 8 Jun. 2012, which designated the U.S. and claims the benefit of U.S. Provisional Application No. 61/607,310, filed 6 Mar. 2012, the entire contents of each of which are hereby incorporated by reference.

TECHNICAL FIELD

Example embodiments presented herein are directed towards providing data transmissions in a multiple antenna system by accounting for a power difference in received reference signals.

BACKGROUND

Overview of Multi-Antenna Systems

Multi-antenna techniques may be used to significantly increase the data rates and reliability of a wireless communication system. System performance may in particular be improved if both the transmitter and the receiver are equipped with multiple antennas, which results in a multiple-input multiple-output (MIMO) communication channel. Such systems and/or related techniques are commonly referred to as MIMO.

The LTE standard is currently evolving with enhanced MIMO support. A core component in LTE is the support of MIMO antenna deployments and MIMO related techniques. For instance there is LTE-Advanced support for a spatial multiplexing mode with the possibly channel dependent precoding. Precoding is a form of beamforming to support multi-layer transmission in multi-antenna wireless communications. Beamforming is a signal processing technique used in sensor arrays for directional signal transmission or reception.

Spatial multiplexing is transmission techniques in MIMO wireless communications to transmit independent and separately encoded data signals from each of the multiple transmit antennas. The spatial multiplexing mode is aimed for high data rates in favorable channel conditions. An illustration of the spatial multiplexing operation is provided in FIG. 1.

As seen FIG. 1, the information carrying symbol vector s is multiplied by an $N_T \times r$ precoder matrix $W_{N_T \times r}$, which serves to distribute the transmit energy in a subspace of the $N_T$ (corresponding to $N_T$ antenna ports) dimensional vector space. The precoder matrix is typically selected from a codebook of possible precoder matrices, and typically indicated by means of a precoder matrix indicator (PMI), which specifies a unique precoder matrix in the codebook for a given number of symbol streams. The r symbols in s each correspond to a layer and r is referred to as the transmission rank. In this way, spatial multiplexing is achieved since multiple symbols can be transmitted simultaneously over the same time/frequency resource element (TFRE). The number of symbols r is typically adapted to suit the current channel properties.

LTE uses OFDM in the downlink (and DFT precoded OFDM in the uplink) and hence the received $N_R \times 1$ vector $y_n$ for a certain TFRE on subcarrier n (or alternatively data TFRE number n) is thus modeled by:

$$y_n = H_n W_{N_T \times r} s_n + e_n$$

where $e_n$ is a noise/interference vector obtained as realizations of a random process. The precoder, $W_{N_T \times r}$, may be a wideband precoder, which is constant over frequency, or frequency selective. Note that the signals above (e.g., $y_n$) could alternatively represent a signal in the time-domain. It is generally understood that signals described herein may represent signals in other domains than in the time-frequency grid of an OFDM system.

The precoder matrix is often chosen to match the characteristics of the $N_R \times N_T$ MIMO channel matrix H, resulting in so-called channel dependent precoding. This is also commonly referred to as closed-loop precoding and generally strives for focusing the transmit energy into a subspace which is strong in the sense of conveying much of the transmitted energy to the user equipment. In addition, the precoder matrix may also be selected to strive for orthogonalizing the channel, meaning that after proper linear equalization at the user equipment the inter-layer interference is reduced.

In closed-loop precoding for the LTE downlink, the user equipment transmits, based on channel measurements in the forward link (downlink), recommendations to the eNodeB of a suitable precoder to use. The user equipment selects a precoder out of a countable and finite set of precoder alternatives, referred to as a precoder codebook. A single precoder that is supposed to cover a large bandwidth (wideband precoding) may be fed back. It may also be beneficial to match the frequency variations of the channel and feedback a frequency-selective precoding report, e.g., several precoders, one per sub-band. This is an example of the more general case of channel state information (CSI) feedback, which also encompasses feeding back other entities than precoders to assist the eNodeB in subsequent transmissions to the user equipment. Such other information may comprise channel quality indicators (CQIs) as well as a transmission rank indicator (RI). For the LTE uplink, the use of closed-loop precoding means the eNodeB is selecting precoder(s) and transmission rank and thereafter signals the selected precoder that the user equipment is supposed to use.

SUMMARY

Active antennas may comprise many subelements and arrays of active antennas may comprise even more. Such antenna configurations were neither thought of, nor taken into account, when existing codebooks where designed. Thus, at least one example object of the example embodiments presented herein is to provide spatial multiplexing transmission techniques in MIMO wireless communications which account for the various subelements which may be comprised in active antenna arrays. Some of the example embodiments are also directed providing improved data communications which may account for power differences based on the spatial multiplexing transmission techniques.

At least one example advantage of such a system is the ability to provide user equipment specific beamforming in an efficient manner. Specifically, user equipment specific beamforming in an azimuth and/or elevation direction may be achieved without the need of excessive feedback overhead from the user equipment and with received power differences accounted accurately accounted for. Another example advantage of the example embodiments presented herein is the ability to refine and significantly match the characteristics of a beamformer used in data transmission, thereby increasing performance in term of spectral efficiency and robustness.

Thus, some of the example embodiments are directed towards a method, in an eNodeB, for data transmission in a multiple antenna system. The eNodeB is comprised in a wireless communications network. The method comprises receiving, from a user equipment, a plurality of signal quality assessments. Each signal quality assessment corresponds to a signal quality level for a distinct direction within at least one correlated domain of the multiple antenna system. The method further comprises receiving, from the user equipment, a CSI report measured on a reference signal that was beamformed into a distinct direction within the at least one correlated domain of the multiple antenna system. The method further comprises determining a beamforming direction for a data transmission to the user equipment based in-part on the plurality of signal quality assessments. The method also comprises estimating a quantity relating to a received power difference between a transmission beamformed as the CSI reference signal and a signal beamformed in the determined beamforming direction, based, at least in part, on said plurality of signal quality assessments. The method also comprises accounting for the received power difference in the data transmission to the user equipment based on the estimating.

Some of the example embodiments are directed towards an eNodeB, for data transmission in a multiple antenna system. The eNodeB is comprised in a wireless communications network. The eNodeB comprises radio circuitry configured to receive, from a user equipment, a plurality of signal quality assessments. Each signal quality assessment corresponds to a signal quality level for a distinct direction within at least one correlated domain of the multiple antenna system. The radio circuitry is further configured to receive, from the user equipment a CSI report measured on a reference signal that was beamformed into a distinct direction within at least one correlated domain of the multiple antenna system. The eNodeB also comprises processing circuitry configured to determine a beamforming direction for a data transmission based in-part on the plurality of signal quality assessments. The processing circuitry is further configured to estimate a quantity relating to a received power difference between a transmission beamformed as the CSI reference signal and a signal beamformed in the determined beamforming direction, based, at least in part, on said plurality of signal quality assessments. The processing circuitry is further configured to account for a received power difference in the data transmission to the user equipment based on the estimation.

Definitions
3GPP 3rd Generation Partnership Project
CoMP Coordinated Multi Point
CRS Common Reference Symbols
CSI Channel State Information
CQI Channel Quality Indicator
DFT Discrete Fourier Transform
DL Downlink
eNB Evolve Node B
EPRE Energy Per Resource Element
FDD Frequency Division Duplexing
GSM Global System for Mobile communications
LTE Long Term Evolution
MIMO Multiple Input Multiple Output
OFDM Orthogonal Frequency-Division Multiplexing
PUSCH Physical Uplink Shared Channel
PMI Precoder Matrix Indicator
RAN Radio Access Network
RF Radio Frequency
RI Rank Indicator
RRC Radio Resource Control
RS Reference Signal
RSRP Reference Signal Received Power
RSRQ Reference Signal Received Quality
RSSI Received Signal Strength Indicator
Rx Receive
TFRE Time/Frequency Resource Element
Tx Transmit
UMB Ultra-Mobile Broadband
UE User Equipment
UL Uplink
WCDMA Wideband Code Division Multiple Access
WiMax Worldwide Interoperability for Microwave Access

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
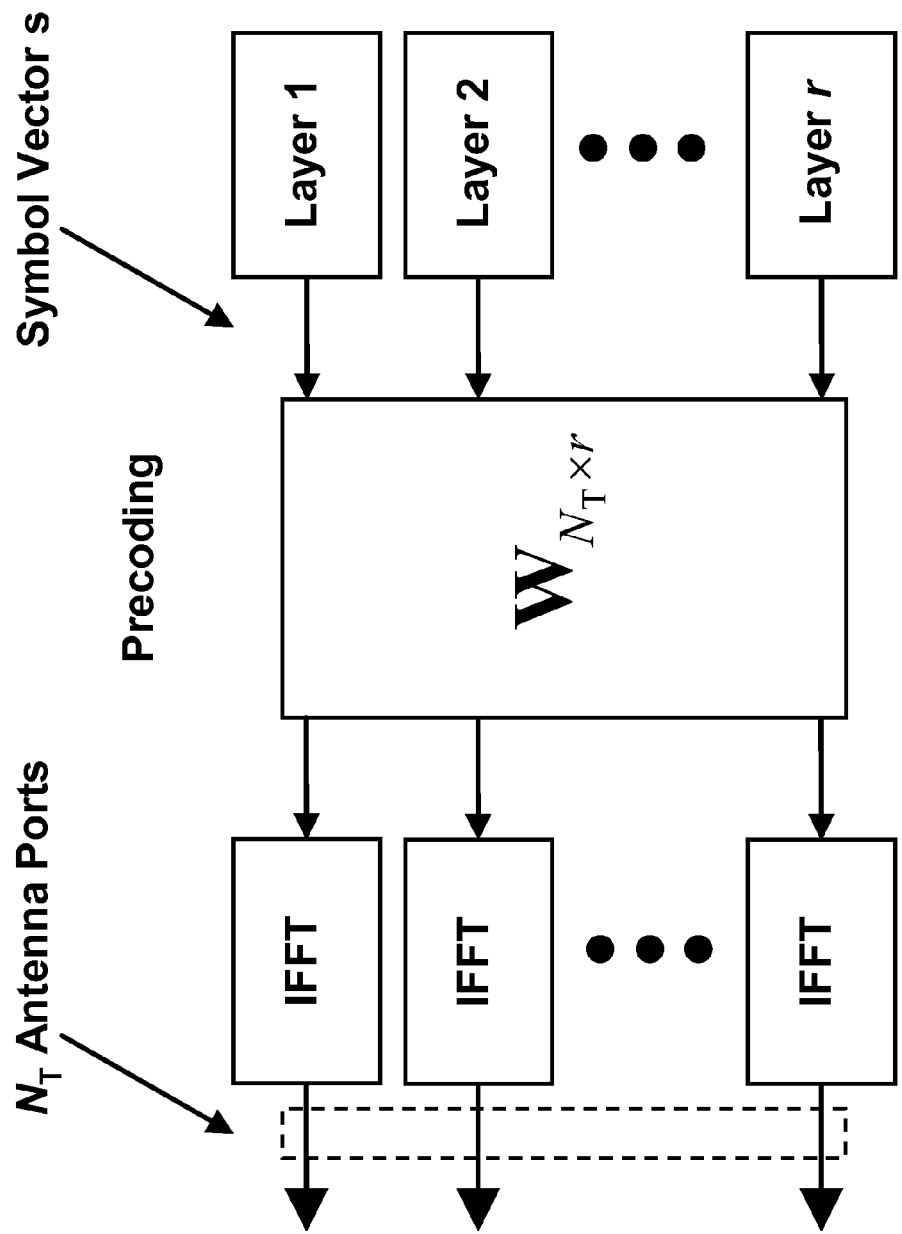
FIG. 1 is an illustration of a transmission structure for a precoded spatial multiplexing mode in LTE.

In the following description, for purposes of explanation and not limitation, specific details are set forth, such as particular components, elements, techniques, etc. in order to provide a thorough understanding of the example embodiments. However, the example embodiments may be practiced in other manners that depart from these specific details. In other instances, detailed descriptions of well-known methods and elements are omitted so as not to obscure the description of the example embodiments.

Some of the example embodiments presented herein are directed towards providing user equipment specific beamforming for downlink communications. As part of the development of the example embodiments presented herein, a problem will first be identified and discussed. The description below is organized as follows.

First, examples of existing precoders will be briefly discussed under the subheading "Examples of Existing Precoder Codebooks for LTE". Thereafter, an introduction on reference symbols which a user equipment may utilize for precoder determination is provided under the subheading "Channel State Information Reference Symbols (CSI-RS)". Afterwards an introduction of CoMP transmission is provided under the subheading "Coordinated Multipoint Transmission". CoMP feedback may be used by the user equipment to send signal quality measurements to the eNodeB. The eNodeB may in-turn provide the downlink communications based on, at least in part, these measurements, according to some of the example embodiments. Thereafter, an introduction to antenna arrays and active antennas is provided under the subheadings "Antenna Arrays" and "Active Antennas", respectively. Afterwards, a detailed analysis of some of the example embodiments will be provided.

Examples of Existing Precoder Codebooks for LTE

2 Tx Codebook

LTE Release-8, the first release of LTE, features the support codebook based precoding for 2 antennas. Up to two layers can be transmitted (rank 1 and rank 2), thus making the precoder matrix $W_{2 \times r}$ of dimension 2×1 and 2×2, respectively.

8 Tx Codebook

LTE Release-10, and later specifications, support a transmission mode for up to 8-layer spatial multiplexing for 8 Tx antennas using user equipment specific RS. Rank adaptation and possibly channel dependent precoding is also supported. User equipment specific RS is used for demodulation purposes and because of that the eNodeB is free to use whatever precoder(s) it wants to, but it may be assisted in the determination of precoder(s) via CSI feedback from the user equipment that includes recommended precoder(s). For the time-frequency resource of interest, the user equipment selects a precoder $W_{8 \times r}$ out of a set of possible precoders in a precoder codebook which then is used together with an input symbol vector $s_{r \times 1}$ to produce an output signal $x_{8 \times 1} = W_{8 \times r} s_{r \times 1}$ for r layers.

Channel State Information Reference Symbols (CSI-RS)

In LTE Release-10, a new reference symbol sequence was introduced with the intent of estimating channel state information, the CSI-RS. The CSI-RS provides several advantages over basing the CSI feedback on the common reference symbols (CRS) which were used, for that purpose, in previous releases. Firstly, the CSI-RS is not used for demodulation of the data signal, and thus does not require the same density (i.e., the overhead of the CSI-RS is substantially less). Secondly, CSI-RS provides a much more flexible means to configure CSI feedback measurements (e.g., which CSI-RS resources to measure on may be configured in a user equipment specific manner). Moreover, the support of antenna configurations larger than 4 antennas should resort to CSI-RS, since the CRS is only defined for at most 4 antennas.

Based on the CSI-RS, the user equipment may estimate the channel and consequently also figure out which precoder suits the particular channel. For the purpose of CSI feedback determination, the user equipment assumes that each of the rows corresponds to an antenna port (ports 15-22) on which a CSI-RS port signal is transmitted. The first row represents antenna port 15, the second row represents antenna port 16, and so on. Each CSI-RS port signal is typically transmitted from an antenna of its own, meaning that there is a direct correspondence between a CSI-RS port and a physical antenna.

Coordinated Multipoint Transmission

Coordinated Multi Point (CoMP) transmission and reception refers to a system where the transmission and/or reception at multiple, geographically separated antenna sites is coordinated in order to improve system performance. The coordination can either be distributed, by means of direct communication between the different sites, or by means of a central coordinating node.

CoMP is a tool introduced in LTE to improve the coverage of high data rates, the cell-edge throughput and/or to increase system throughput. In particular, the goal is to distribute the user perceived performance more evenly in the network by taking control of the inter-cell interference.

CSI-RS Received Power

In order to enable efficient CoMP schemes, new forms of CSI feedback are potentially needed. For instance it is an agreed working assumption, for LTE Rel-11, that the network can configure a user equipment to report signal qualities (e.g., received signal powers) based on measurements on a configured set of CSI-RS resources. A CSI-RS resource may loosely be described as the pattern of resource elements on which a particular CSI-RS configuration is transmitted. A CSI-RS resource may be configured through RRC signaling.

Such a measurement could be done coherently, in which case the user equipment needs to know the CSI-RS sequence that is transmitted on the CSI-RS resource, or incoherently in which case the transmitted actual sequence can be transparent to a user equipment. It should be appreciated that herein any signal quality measure based on measurements on CSI-RS resources is referred to as "CSI-RS received power" (CSI-RSRP), but it should be understood that CSI-RSRP encompasses any quantity that represents a received quality of a CSI-RS signal. The estimated values of the CSI-RSRP may then be fed back from the user equipment to the eNodeB.

Antenna Arrays

Figure 2:
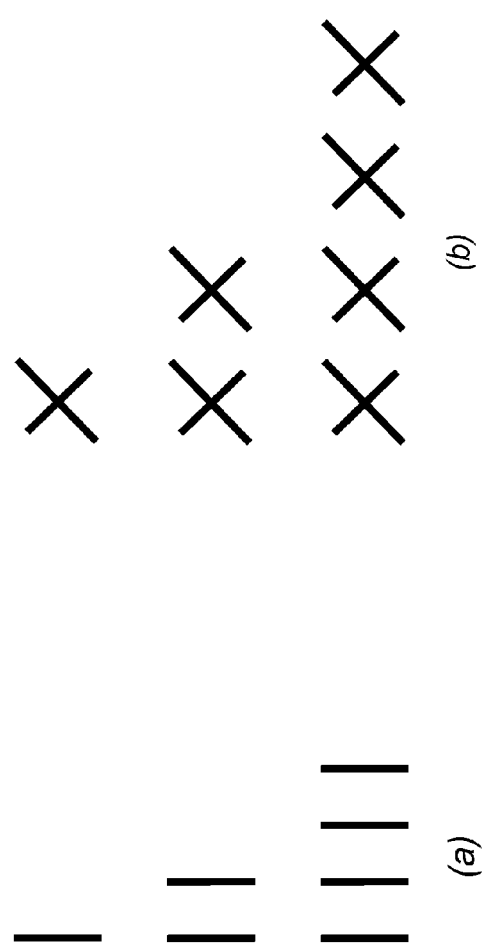
FIG. 2A is an example illustration of a co-polarized antenna configuration.
FIG. 2B is an example illustration of a cross-polarized antenna configuration.

On the network side, base stations are often equipped with multiple antennas to be used for reception and transmission. The antennas intended for a transmission point (e.g., a cell, and/or a sector), form a so-called antenna array. Some typical antenna array constellations are illustrated in FIG. 2. For instance, one common antenna array layout is to use co-polarized antennas in order to construct antenna arrays as shown in FIG. 2(*a*). Furthermore, another common layout is to instead use cross-polarized antennas as shown in FIG. 2(*b*).

Figure 3:
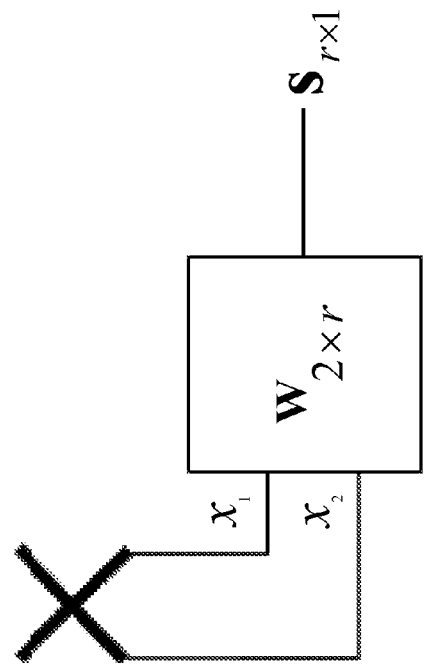
FIG. 3 is a depiction of codebook based precoding with a 2 Tx cross-polarized antenna array.

Using, for example, a 2 Tx cross-polarized antenna array (c.f. the top most antenna setup in FIG. 2(*b*)) implies that the antenna array is fed with two signals, $x_1$ and $x_2$. This is illustrated in FIG. 3 where it has been assumed that a 2 Tx antenna array is used with codebook based precoding, so that the transmitted signal is $x_{2 \times 1} = W_{2 \times r} s_{r \times 1}$.

Active Antennas

Figure 4:
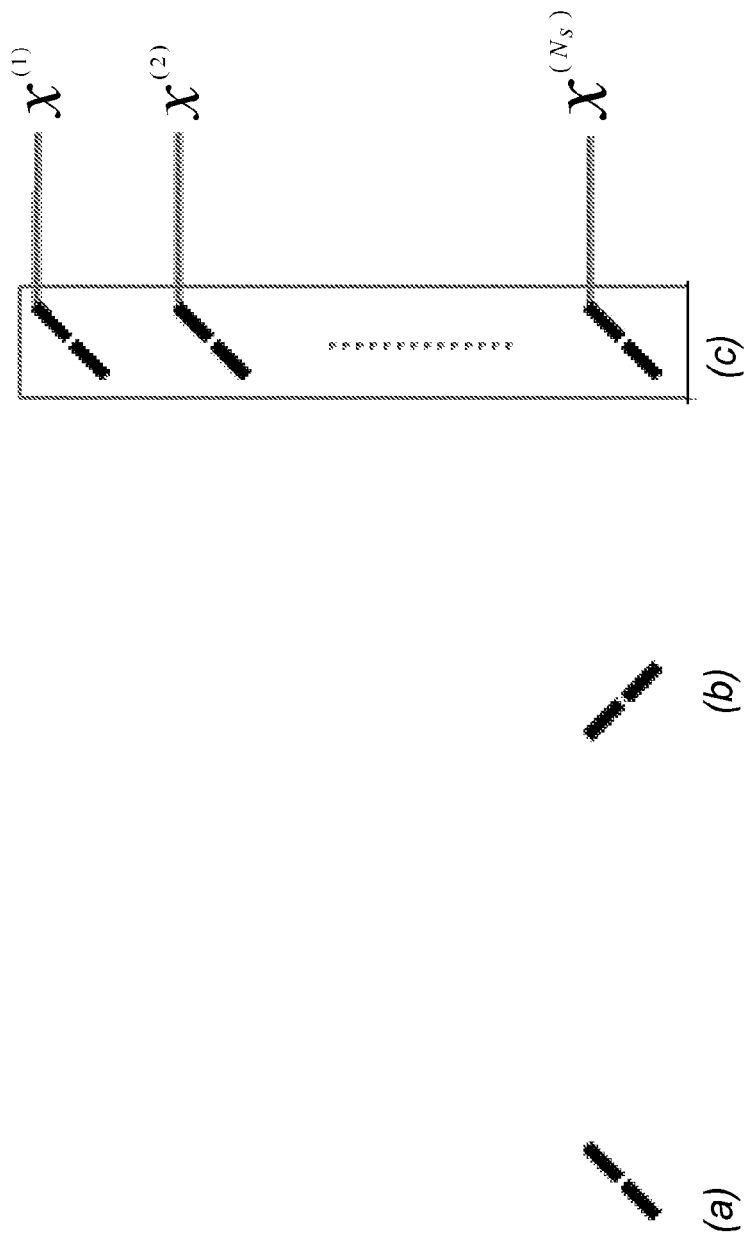
FIG. 4A is an illustration of an antenna subelement.
FIG. 4B is an illustration of an antenna subelement featuring orthogonal polarization compared to the subelement of FIG. 4A.
FIG. 4C is an illustration of an active antenna array.

An active antenna comprises a number of subelements that jointly form the antenna. In FIG. 4(*a*) a subelement, in practice may be realized by a small physical device, as is illustrated. Each subelement will have a polarization direction which potentially can be orthogonal to another subelement's polarization. This is illustrated in FIG. 4(*b*) where a subelement with orthogonal polarization compared to the subelement in FIG. 4(*a*) is shown. Finally, in FIG. 4(*c*) an active antenna array which consists of $N_S$ subelements is shown. In general, but not necessarily, all the subelements of an active antenna are of the same polarization. Note that each given subelement i can be fed the given signal $x^{(i)}$ not necessarily equal to $x^{(j)}$.

Herein, when dealing with more than one active antenna, the notation $x_i^{(j)}$ will be utilized when referring to a signal, or function, related to the j:th subelement in the i:th antenna. These indexes will however be omitted when it is clear from the context what is being referred.

Figure 5:
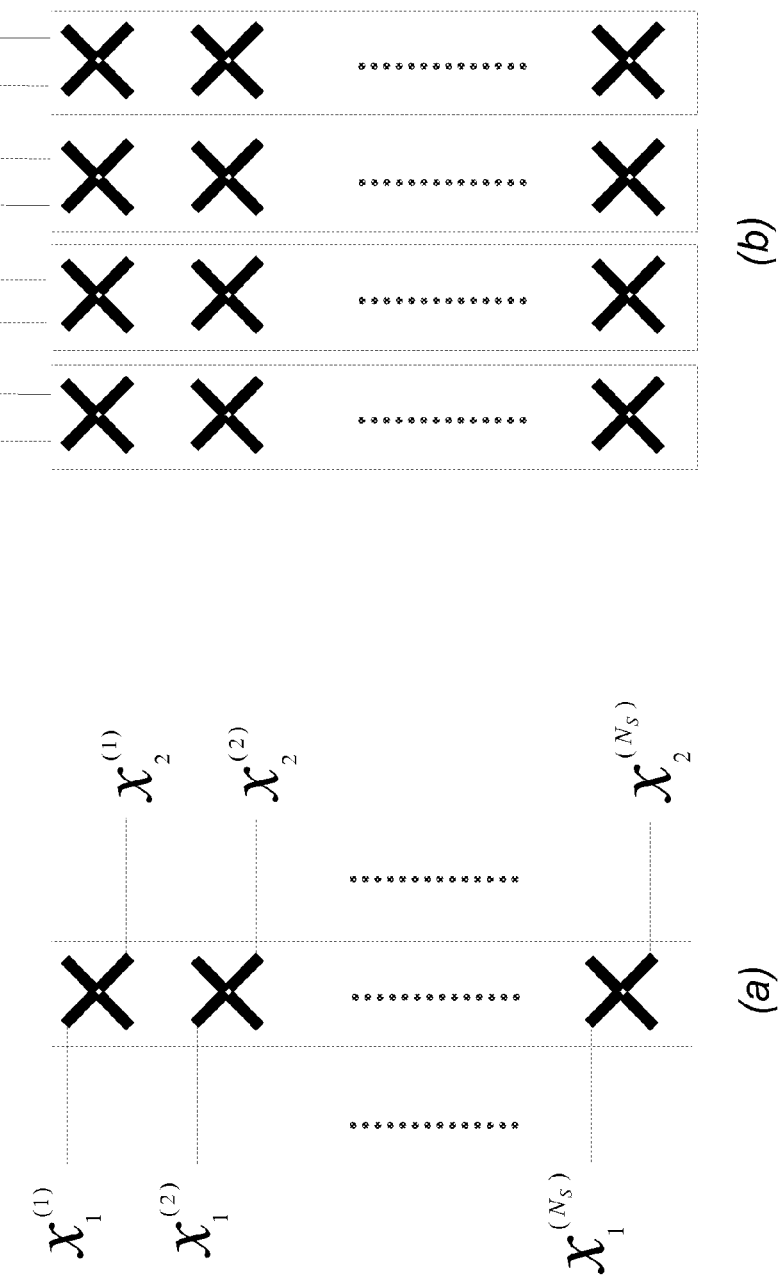
FIG. 5A is an illustration of a 2 Tx active antenna array.
FIG. 5B is an illustration of a 8 Tx active antenna array.

By combining two active antennas of different polarizations, as illustrated in FIG. 5(*a*), a 2 Tx antenna array may be created and fed with two different signals, $x_1$ and $x_2$ where $x_i = [x_i^{(1)} \ldots x_i^{(N_S)}]^T$. Furthermore, by combining multiple 2 Tx antenna arrays, as illustrated in FIG. 5(*b*), an 8 Tx antenna array may be created. Here the signals $x_i^{(j)}$ are no longer explicitly shown but they are still assumed to be present in the same manner as in FIG. 5(*a*).

Existing precoder codebooks in different standards have been designed for conventional antenna arrays. For example, in LTE Release 10 and beyond, precoder codebooks for 2, 4 or 8 Tx antennas are supported. There is thus a precoder codebook suitable for each antenna array type. Hence, when using, for example, a 2 Tx antenna array, the standard is designed to use the 2 Tx codebook meaning that $x_1$ and $x_2$ can be fed to the antenna array just as in FIG. 3.

Active antennas comprise many subelements and arrays of active antennas comprise even more. Such antenna setups were neither thought of, nor taken into account, when the existing codebooks were designed. Therefore, existing codebooks do not utilize the fact that the subelements can be accessed as illustrated in FIG. 5.

Moreover, for large active antenna deployments, the sheer number of sub-element antenna ports can create so many degrees of freedom that the CSI feedback overhead from a user equipment becomes prohibitive.

Active antennas, antenna arrays and arrays of active antennas may be generalized to a system of multiple antennas. Herein, the phrase multiple antenna system is used to describe a set of antennas (comprising one active antenna with multiple sub-elements) that constitutes a transmission point (i.e., with the intent to serve a sufficiently isolated region of space, such as a cell and/or sector).

Another option is to base the determination of a beamformer in a correlated domain by means of, for example, uplink measurements. Resorting to uplink measurements does however have several limitations. An example of such a limitation may be in deployments with downlink inter-frequency carrier aggregation. In such a scenario, it is unlikely that all terminals support the matching uplink carrier aggregation. Hence, for this scenario it will not be possible to perform uplink measurements relevant for all carriers.

Another example of such a limitation is in FDD systems where the uplink and downlink carriers are separated in frequency, and the measurements made in uplink may have reduced accuracy in the downlink. A further example is an implementation disadvantage to introduce coupling between uplink and downlink processing.

The techniques described herein allow for feedback from the user equipment to be generated and used for guiding user equipment specific beamforming in the azimuth and/or elevation domain by using multiple antenna systems even when existing codebooks not are designed for this purpose.

The basic concept of the example embodiments is to configure a set of CSI-RS resources, precoded in such a way that each CSI-RS span a direction within a correlated domain (i.e., a correlated vector space) of a multiple antenna system. By configuring a user equipment to measure and report the corresponding CSI-RSRP values to the network, the eNodeB can use these values to improve the directivity within the correlated domain of the transmission, such that the power transmitted along directions with poor signal quality is minimized, and power is transmitted along directions with good signal quality.

By utilizing the CSI-RSRP to acquire information about relatively stationary directions, the regular rapid PMI reporting can be offloaded to cover only the more dynamic variations in the channel, for which it has been designed.

Overview of Beamforming According to the Example Embodiments

In this section, the example embodiments will be illustrated in more detail by a number of examples. It should be noted that these embodiments are not mutually exclusive. Components from one embodiment may be tacitly assumed to be present in another embodiment and it should be appreciated those components may be used in the other example embodiments.

The example embodiments will be presented as follows. First, a description of how feedback data may be utilized in providing user specific beamformed communications is provided under the subheading "Generating Beamforming from CSI-RSRP Feedback". Thereafter, a description on how feedback may be utilized to improve the beamformed communications is provided under the subheading "Refined Use of the Received CSI-RSRP Beamforming Feedback". Finally, example node configurations and example node operations are provided under the subheadings "Example Node Configuration" and "Example Node Operations", respectively.

Generating Beamforming from CSI-RSRP Feedback

In the following exemplary embodiments the target is to illustrate how beamforming feedback may be created by using CSI-RSRP measurements, potentially in combination with regular RI/PMI/CQI feedback.

Generating Elevation Beamforming from CSI-RSRP Feedback

Radio propagation channels tend to be highly correlated in the elevation direction (i.e., the elevation domain), in particular for antennas that are deployed over rooftops. Such correlation may result in almost all power of the radio wave, which reaches a user equipment, typically traverses directions closely clustered in elevation domain. Specifically, typically all power is confined to one or two tight clusters in elevation.

In this example embodiment a set of CSI-RS signals are configured to span different elevation directions. By configuring a user equipment to measure and report the corresponding CSI-RSRP values, the network (e.g., eNodeB) may determine an elevation beamformer guided by reported CSI-RSRP values, each corresponding to an associated elevation. For example, the eNodeB may select the elevation beamformer used for the CSI-RS with the highest reported CSI-RSRP.

Figure 6:
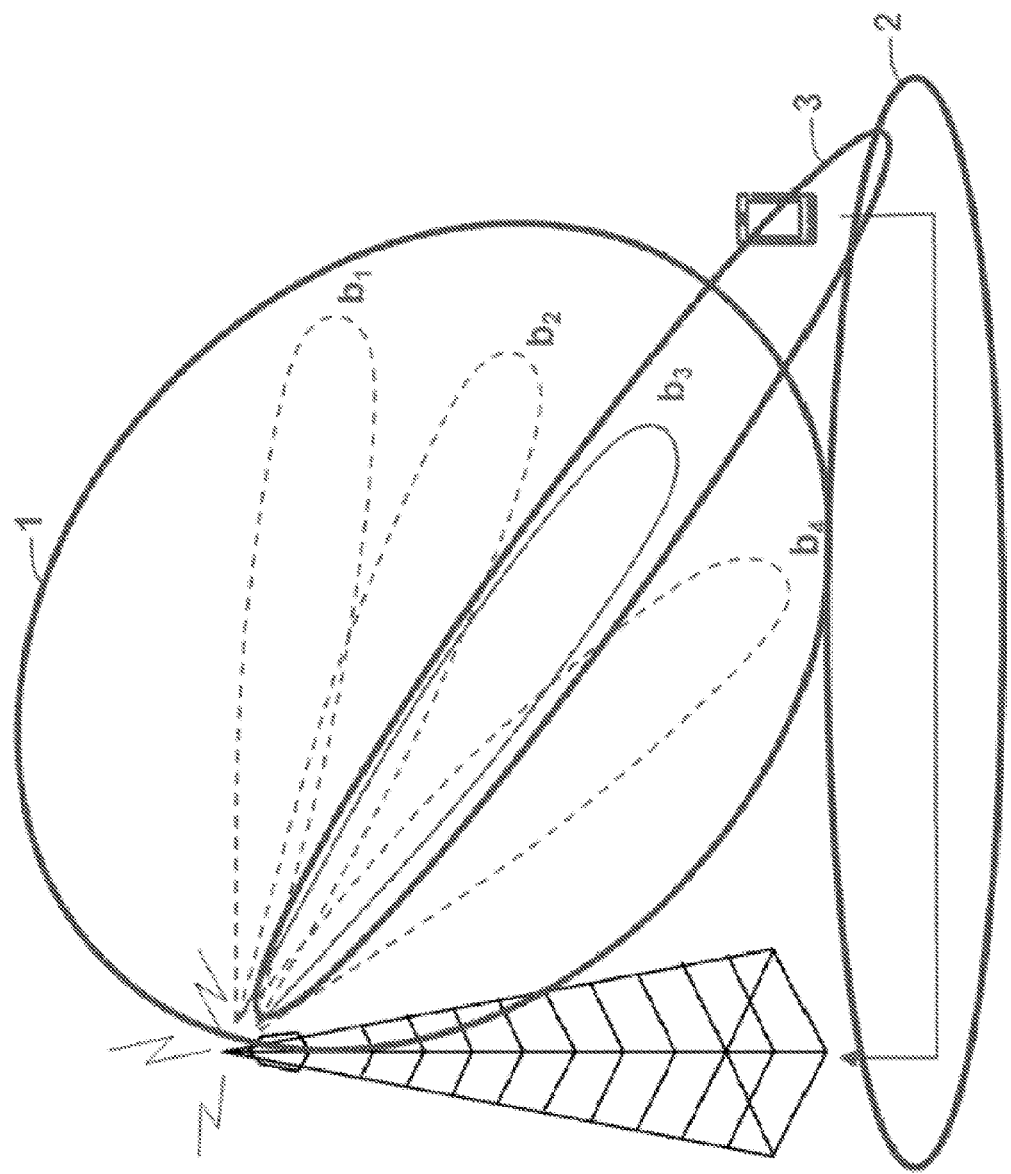
FIGS. 6 and 7 is an example illustration of message transmission, according to some of the example embodiments.

FIG. 6 provides an example illustration of the communications which may be transmitted between an eNodeB and a user equipment. First, the eNodeB may transmit any number of CSI-RS reference signals to the user equipment (shown as circle 1). The eNodeB may configure the user equipment to measure and report the corresponding CSI-RSRP for at least a subset of transmitted signals. Thereafter, the eNodeB may receive the corresponding CSI-RSRP report for the user equipment (circle 2). Finally, the eNodeB may transmit data to the user equipment taking the received CSI-RSRP values into account in the selection of an elevation beamformer that is used in subsequent data transmissions.

The communications illustrated in FIG. 6 will now be mathematically described. Consider the case with a $N_A$ Tx active antenna array where each antenna comprises $N_S$ sub-elements. A design featuring $N_Q$ vectors yields the following:

$$b_q = \begin{bmatrix} b_{1,q} \\ b_{2,q} \\ \vdots \\ b_{N_S,q} \end{bmatrix}, q = 1, \ldots, N_Q$$

where $b_q$ corresponds to a beamforming vector when applied to the subelements of the i:th active antenna in the $N_A$ Tx active antenna array. It should be appreciated that the above representation may be extended to configurations with different number of subelements in each antenna. Furthermore, it should be appreciated that the concept of a subelement is non-limiting in the sense that it may refer to any virtualization (e.g., linear mapping) of the physical antenna elements. For example, pairs of physical subelements may be fed the same signals, and hence share the same virtualized subelement antenna port.

The representation provided above will hence correspond to beamforming in the elevation assuming that the subelements are placed vertically, where each $b_q$ typically corresponds to a targeted elevation direction. The following beamformer matrix may thereafter be created:

$$B_{N_A N_S \times N_A}(q) = \begin{bmatrix} b_q & 0 & \cdots & 0 \\ 0 & b_q & & \vdots \\ \vdots & & \ddots & \\ 0 & \cdots & & b_q \end{bmatrix}, q = 1, \ldots, N$$

The matrix presented above may be used to create the port to subelement mapping as $$\tilde{x}_{N_A N_S \times 1}(q) = B_{N_A N_S \times N_A}(q) x_{N_A \times 1}(q)$$

where $x_{N_A \times 1}(q)$ is a CSI-RS signal for $N_A$ ports. For the created output vector $\tilde{x}_{N_A N_S \times 1}(q)$ it is assumed that the first $N_S$ values correspond to the subelements of one active antenna and that the second $N_S$ values correspond to the subelements of a second active antenna, etc. Hence, the equation above describes a mapping from the $N_A$ ports CSI-RS to the $N_A N_S$ subelements. It should be appreciated that the structure here corresponds to each active antenna in the array having the same elevation beam. It is however possible to use a different elevation beam on each active antenna.

Due to the special structure in the beamformer matrixes, each index q corresponds to a transmission in a certain direction defined by the beamformers $b_1, \ldots, b_{N_Q}$. Typically, the different CSI-RS signals, $x_{N_A \times 1}(q)$, may be configured to be orthogonal, for example, separated to different time/frequency resources.

Now, let the eNodeB be configured to transmit $\tilde{x}_{N_A N_S \times 1}(q)$ for $q=1, \ldots, N_Q$. Furthermore, assume some user equipments are configured to report back the corresponding CSI-RSRP values meaning that one signal quality assessment, $RSRP_q$ per reporting user equipment may be feedback for each transmitted $\tilde{x}_{N_A N_S \times 1}(q)$, each corresponding to an associated elevation beam. This will provide the eNodeB with useful information regarding which elevation beamforming vector to choose for subsequent transmissions (e.g., data transmissions) to a user equipment.

One potential choice for a beamforming vector may be for instance be to choose the elevation beamforming vector, $b_q$ corresponding to the strongest $RSRP_q$. The subsequent data transmission may further combine the selected elevation beamformer with, for example, azimuth and inter-polarization beamforming which, may be based on a PMI recommendation by the user equipment.

Alternatively, since the set of CSI-RS resources to measure RSRP on can be configured UE-specifically, a UE can be configured to feed back only those RSRP values that are of relevance to a particular UE (i.e., there is no need for a distant UE to feed back RSRP values for CSI-RS resources that are associated with very steep elevation angles).

Using CSI-RS with Fewer Ports than $N_A$

According to some of the example embodiments, the CSI-RSRP measurements for generating elevation beamforming feedback may be created from any subset of $N_A$ ports CSI-RS. For example, in common case of a $N_A$ Tx cross-polarized active antenna, with $N_A/2$ active antennas in each polarization, the beamformer matrix $B_{N_A N_S \times N_A}(q)$ may be represented as:

$$B_{N_A N_S \times 2}(q) = \begin{bmatrix} b_q & 0 \\ \vdots & \vdots \\ b_q & 0 \\ 0 & b_q \\ \vdots & \vdots \\ 0 & b_q \end{bmatrix}$$

where it is assumed that the first column will target the first polarization and the second column will target the other polarization in the beamformer matrix. Applying the port to antenna mapping results in the follow equation:

$$\tilde{x}_{N_A N_S \times 1}(q) = B_{N_A N_S \times 2}(q) x_{2 \times 1}(q)$$

where $x_{N_A \times 1}$ is a two port CSI-RS which may enable elevation beamforming feedback that may be utilized for at least one of the polarizations. Hence, this will provide useful information for the eNodeB regarding which beamforming vector to choose for each polarization.

A more general case corresponds to adding a precoder, W, that distributes a r port CSI-RS pattern into $N_A$ ports, such that:

$$\tilde{x}_{N_A N_S \times 1}(q) = B_{N_A N_S \times N_A}(q) W_{N_A \times r} x_{r \times 1}(q),$$

where the above embodiment may be captured by configuring W as $$W_{N_A \times 2} = \begin{bmatrix} 1 & 0 \\ 0 & 1 \end{bmatrix},$$

where 0 and 1 are the vectors of all zeros and ones (with $N_A/2$ elements), respectively. For instance, for CSI-RS resources used to measure elevation directions, it would be useful to try to spread the CSI-RS as evenly as possible in the azimuth direction, which corresponds to designing W to have as broad of an azimuth main lobe as possible. Typically, one would like to have the elevation lobe quite narrow and therefore the beamforming vector may be designed accordingly. The lobe in azimuth should on the other hand be quite wide and therefore the matrix W (which creates this lobe) may be designed accordingly. Such a wide lobe may be achieved by, for example, spreading each port of a CSI-RS on all antennas, but with the phase rotations such that in no targeted direction the transmitted signals all destructively (or constructively) combine. Another alternative, according to some of the example embodiments, is to introduce azimuth phase variations over frequency, in which case the beam, as seen over the entire bandwidth, may be very wide. Yet another alternative is to divide the transmit antennas in groups and transmit a specific CSI-RS port on antennas in one such group only (within a group of antennas the CSI-RS port can be transmitted with a wide lobe). This will have the benefit that there will be no destructive/constructive combining between the different groups of antennas because different antenna ports of a CSI-RS are quasi orthogonal. It should be appreciated that W may also be made dependent on q, where there could be one beamformer for each CSI-RS.

Alternatively, for deployments with copolarized antennas, or for which there is a negligible risk of destructive combining over the polarizations, (or the system bandwidth provides sufficient randomization over frequency), a single port CSI-RS may be used, $x_{1 \times 1}(q)$, in combination with:

$$B_{N_A N_S \times 1}(q) = \begin{bmatrix} b_q \\ \vdots \\ b_q \end{bmatrix}.$$

Furthermore, it should be appreciated that other beamformer matrixes $B_{N_A N_S \times k}(q)$ may be utilized in order to adapt to k ports CSI-RS.

Generating Azimuth Beamforming Feedback from CSI-RSRP

In the above descriptions of the example embodiments, it is explained how CSI-RSRP may be utilized in order to generate elevation beamforming feedback. The example embodiments presented herein however are not restricted to be applied in the elevation domain. It should be appreciated that the example embodiments may be utilized in order to create beamforming feedback in any other domain or direction, for example in an azimuth domain or direction.

Generating Joint Azimuth and Elevation Beamforming Feedback from CSI-RSRP

It should also be appreciated that the example embodiments presented herein may be used to generate joint elevation and beamforming feedback. Following the example steps provided under the subheading "Generating Elevation Beamforming from CSI-RSRP", the following representation of $N_Q$ beamforming vectors may be provided:

$$b_q = \begin{bmatrix} b_{1,q} \\ b_{2,q} \\ \vdots \\ b_{N_A N_S, q} \end{bmatrix}, q = 1, \ldots, N_Q$$

such that $b_q$ corresponds to a polarization specific beamforming vector when applied to a cross polarized active antenna array (e.g., that has its antenna elements and subelements positioned to span both elevation and azimuth domain). This will hence potentially imply beamforming in both elevation and azimuth. Now consider the following beamforming matrix:

$$B_{N_A N_S \times 2}(q) = \begin{bmatrix} b_q & 0 \\ 0 & b_q \end{bmatrix}, q = 1, \ldots, N$$

where the two columns represent the two polarizations. Therefore, the port to subelement mapping may be provided as:

$$\tilde{x}_{N_A N_S \times 1}(q) = B_{N_A N_S \times 2}(q) x_{2 \times 1}(q)$$

where it is assumed that $x_{2 \times 1}(q)$ is an CSI-RS for 2 ports. Hence, this will provide useful information for performing joint azimuth and elevation beamforming. It should be appreciated that the example embodiments described above may be extended to be used with copolarized arrays, and/or to use CSI-RS with less or more than 2 ports, by for example applying a precoder to the CSI-RS or by modifying $B_{N_A N_S \times r}(q)$ accordingly.

In summary, through a special configuration of CSI-RSRP and corresponding measurements, it is possible to generate information suitable as feedback for elevation beamforming. Based on this information the eNodeB may decide on elevation beamforming vectors to use for the active antennas.

It should be appreciated that the beamformer matrices $B_{N_A N_S \times N_A}$ may be extended to consider the case when different active antennas use different beamformer vectors $b_q$. It should be noted that in the following we refer to a beamforming direction as a primary pointing angle of a beamforming vector. Hence, a distinct beamforming direction corresponds to using a beamformer with primary pointing angle in the distinct direction.

It should further be appreciated that each of the reference signals may be transmitted in a distinct beamforming direction $b_n$, however, the transmitted data itself may be overlapping. It should also be appreciated that the reporting periodicity and/or mechanism is not essential for the example embodiments. The reporting may, for example, be configured so that a feedback report is triggered at a certain periodicity. Alternatively, the feedback report may be provided by an event based triggering that may be provided by the user equipment. Thus, the signal quality assessment, $RSRP_q$, may be reported if a sufficient change has incurred.

Refined Use of the Received CSI-RSRP Beamforming Feedback

In this section further example embodiments are presented on how to use user equipment provided feedback in order to perform the beamforming based on the received feedback. The example embodiments described in this subheading are explained with the use of elevation beamforming. It should be appreciated that any of the example embodiments presented herein may also be applied to other kinds of beamformings, for example, azimuth beamforming and joint azimuth and elevation beamforming.

Furthermore, in the following section it is assumed that the eNodeB may be configured to transmit a set of CSI-RS in order to obtain elevation beamforming feedback as described as in the section entitled "Generating Beamforming Feedback from CSI-RSRP". It should be appreciated that the eNodeB also may be configured to transmit another set of CSI-RS corresponding to the 'traditional' use of CSI-RS, hence estimating the channel and generating CQI(s), etc. In order to distinguish between the two uses of CSI-RS, in the following sections the term '(elevation) CSI-RS' will be utilized when referring to a CSI-RS configured for generating elevation beamforming feedback, and the term '(traditional) CSI-RS' will be utilized when referring to a CSI-RS configured for the traditional use of the CSI-RS. These clarifications will however be omitted when it is clear from the context what is being referred. It should be appreciated that the term traditional CSI-RS is non-limiting and may, for example, refer to a CRS or any other signal used for user equipment based reporting of CSI (e.g., CQI, PMI, RI, etc.).

Using CSI-RSRP for Elevation Beamforming

In this subsection, example embodiments are presented on how to use the CSI-RSRP feedback, described under the subheading "Generating Beamforming Feedback from CSI-RS", to carry out elevation beamforming for data (and control) signals to a user equipment. As previously stated, one potential way to choose the elevation beamformer vector for the active antenna may be to use the elevation beam corresponding to the best reported signal quality assessment; for example, use the elevation beamformer $b_{qmax}$, where $$q_{max} = \arg\max_q \{RSRP_q\}.$$

Hence, based on the received feedback, a new beamformer matrix may be provided. The beamformer matrix may be represented as:

$$B^{(data)}_{N_A N_S \times N_A} = \begin{bmatrix} b_{q_{max}} & 0 & \cdots & 0 \\ 0 & b_{q_{max}} & & \vdots \\ \vdots & & \ddots & \\ 0 & \cdots & & b_{q_{max}} \end{bmatrix}$$

and the port to subelement mapping may be represented as:

$$\tilde{x}_{N_A N_S \times 1} = B^{(data)}_{N_A N_S \times N_A} x_{N_A \times 1}$$

where $x_{N_A \times 1}$ may comprise precoded data $x_{N_A \times 1} = W_{N_A \times r} s_{r \times 1}$ of rank r.

For the (traditional) CSI-RS, another beamforming vector $b_{N_S \times 1}^{(traditional)}$ may be created. The traditional beamforming vector may be represented as:

$$B^{(traditional)}_{N_A N_S \times N_A} = \begin{bmatrix} b^{(traditional)}_{N_S \times 1} & 0 & \cdots & 0 \\ 0 & b^{(traditional)}_{N_S \times 1} & & \vdots \\ \vdots & & \ddots & \\ 0 & \cdots & & b^{(traditional)}_{N_S \times 1} \end{bmatrix}.$$

Thus, the (traditional) CSI-RS may be transmitted using the port to subelement mapping represented as:

$$\tilde{x}_{N_A N_S \times 1} = B^{(traditional)}_{N_A N_S \times N_A} x_{N_A \times 1}.$$

Thus, by using the example embodiments described, it is possible to transmit data with the chosen beamforming vector $b_{q_{max}}$. At the same time, it is also possible to generate channel estimates (e.g., CQI, PMI, RI, etc.) or recommendations by transmitting (traditional) CSI-RS in the proposed manner. This feedback may then be used by the eNodeB, in a traditional fashion, and potential power offsets may, for example, be compensated by an outer loop link adaptation in the network. It should be appreciated that the use of the notation CQI, RI, and PMI in this context should be interpreted in the wider scope of general channel state information feedback used to assist the eNodeB in determining, for example, precoders, transmission rank, and coding and modulations schemes.

It should be appreciated that the (elevation) CSI-RS and the (traditional) CSI-RS need not be configured using the same number of ports $N_A$. The example embodiments may utilize a different number of ports for the different CSI-RS resources.

It should also be appreciated that one potential design choice for the example embodiments presented in this subsection is to set $b_{N_S \times 1}^{(traditional)} = b_{q_j}$ for some $q_j$. This implies that for this $q_j$ the same CSI-RS may be used both as (elevation) CSI-RS and (traditional) CSI-RS thereby potentially decreasing the payload of the transmitted CSI-RS.

Improving CSI Estimates by Using Received RSRP

Transmitting precoded data and (traditional) CSI-RS, as presented in section above, results in only the precoded data being affected by the decided elevation beamforming matrix, whereas the (traditional) CSI-RS will be unaffected since it is potentially using another beamformer matrix. This will therefore imply that the (traditional) CSI-RS and the transmitted precoded data will experience two different channels. Therefore, the produced channel estimate from the (traditional) CSI-RS does not necessarily correspond well with the channel experienced by the transmitted data. In the following embodiments we will present solutions to this. Thus, some of the example embodiments presented herein are directed towards utilizing received RSRP to remedy this discrepancy.

According to some of the example embodiments, the fact that access to both RSRP measurements from the (elevation) CSI-RS and the (traditional) CSI-RS are available may be exploited. Thus, the difference experienced in the channels may to some extent be estimated. For example, the quotient $RSRP_{q_{max}}/RSRP^{(traditional)}$ may indicate the difference in channel magnitude when transmitting with the beamformer vector $q_{max}$, used when transmitting data, and the beamformer corresponding to (traditional) CSI-RS. Hence, by exploiting these measurements the channel experienced by the data can be estimated from the (traditional) CSI-RS.

According to some of the example embodiments, one way is to use $RSRP_{q_{max}}/RSRP^{(traditional)}$ to derive an offset as to adjust SINR estimates derived from the reported CQI. The power measurement offset could alternatively be applied directly by the terminal when it recommends a CQI. Such an user equipment-applied offset may be configured in LTE using, for example, the nomPDSCH-RS-EPRE-Offset parameter which is configured by the network, or the CSI-RS related parameter $P_c$ in Rel-10: "$P_c$ the assumed ratio of PDSCH EPRE to CSI-RS EPRE when UE derives CSI feedback", as is explained in 3GPP TR 36.813 V10.4.0.

Figure 7:
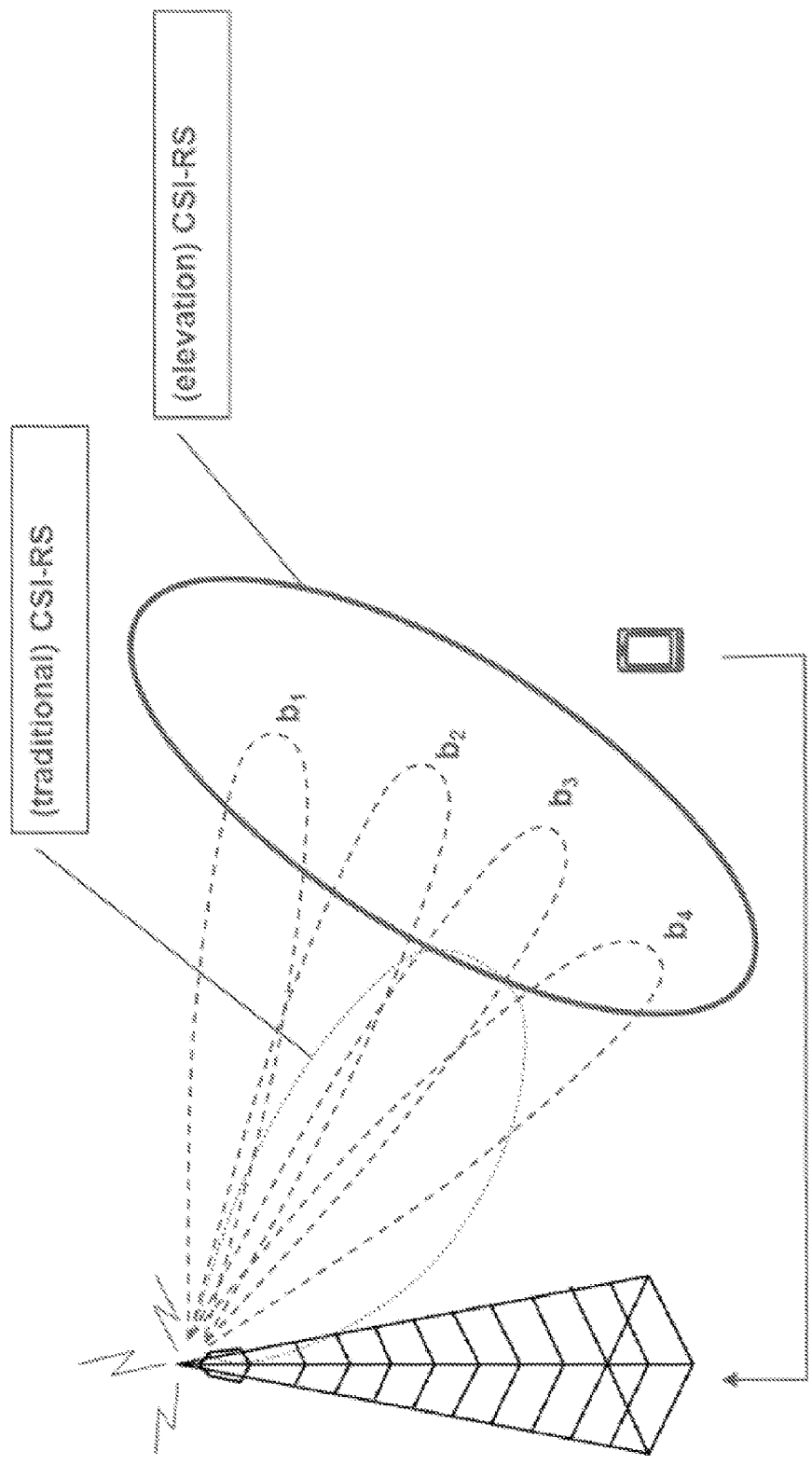

FIG. 7 illustrates an example of the communications which may be transmitted between the eNodeB and the user equipment according to some of the example embodiments described under the subheading "Refined use of the received CSI-RSRP Beamforming Feedback".

As shown in FIG. 7, the eNodeB may send (elevation) CSI-RS to a user equipment (illustrated by circle 1 of FIG. 7). The user equipment may provide feedback data to the eNodeB based on the (elevation) CSI-RS, as described under the subheading "Generating beamforming feedback from CSI-RSRP" (illustrated by numeral 2 of FIG. 7). The eNodeB may also send (traditional) CSI-RSRP to the user equipment to be utilized as described under this subheading (illustrated by circle 3 of FIG. 7). Thereafter, the eNodeB may determine a received power difference between the received feedback of (elevation) CSI-RSRP and the received feedback of (traditional) CSI-RSRP. With the power difference determined, the eNodeB may send communications to the user equipment (illustrated by numeral 4 in FIG. 7). The communications may be compensated with respect to the determined power difference. It should be appreciated that each of the reference signals may comprise of two groups, (traditional) CSI-RS and (elevation) CSI-RS which may be elevation and/or azimuth related CSI-RS. It should also be appreciated while the example embodiment illustrates two distinct CSI-RS sets, these two sets may comprise overlapping components. In some example embodiments the two CSI-RS sets may be completely overlapping.

Example Node Configurations

Figure 8:
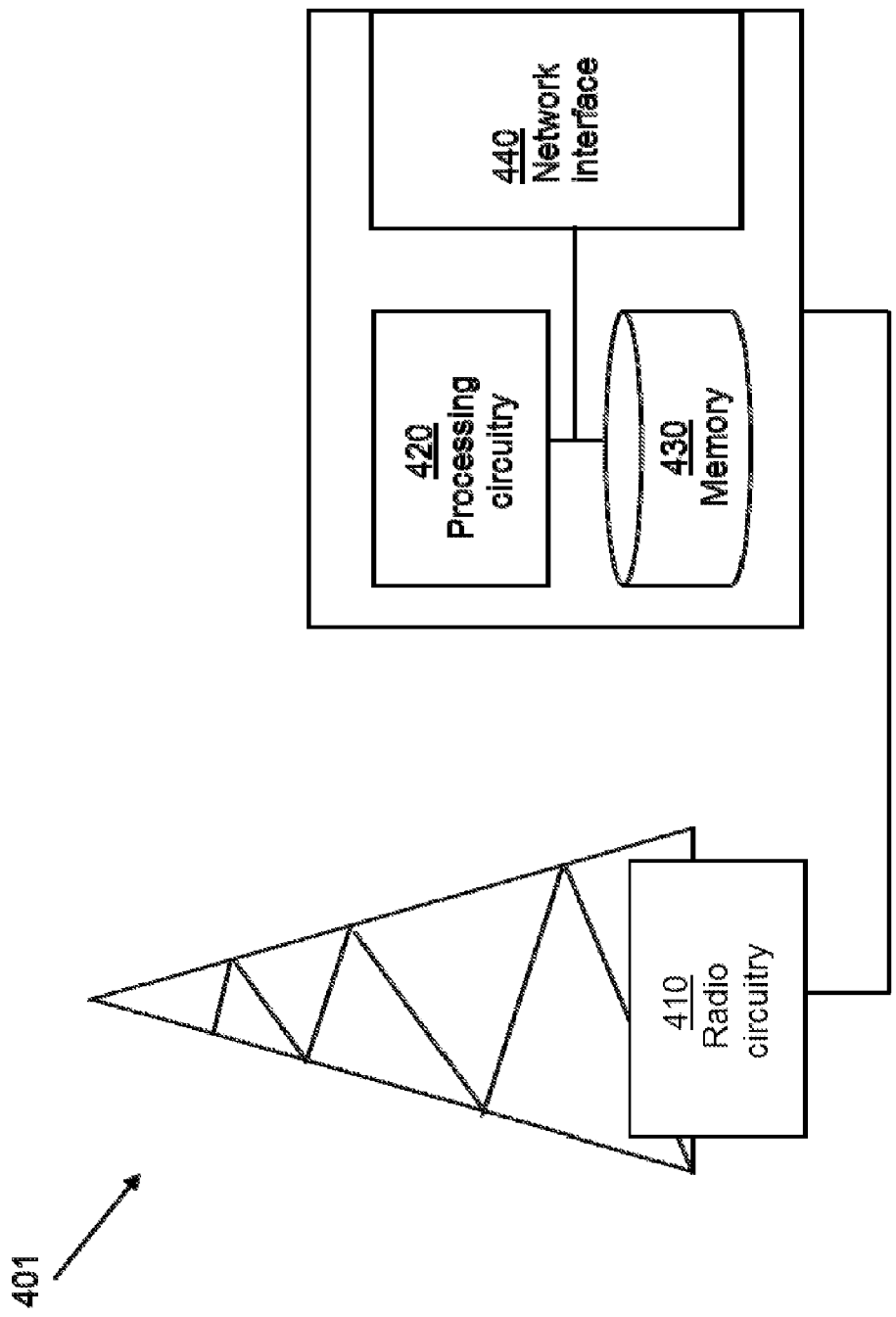
FIG. 8 is an example node configuration of an eNodeB, according to some of the example embodiments.

FIG. 8 illustrates an example of an eNodeB 401 which may incorporate some of the example embodiments discussed above. As shown in FIG. 8, the eNodeB 401 may comprise a radio circuitry 410 configured to receive and transmit any form of communications or control signals within a network. It should be appreciated that the radio circuitry 410 may be comprised as any number of transceiving, receiving, and/or transmitting units or circuitry. It should further be appreciated that the radio circuitry 410 may be in the form of any input/output communications port known in the art. The radio circuitry 410 may comprise RF circuitry and baseband processing circuitry (not shown).

The eNodeB 401 may further comprise at least one memory unit or circuitry 430 that may be in communication with the radio circuitry 410. The memory 430 may be configured to store received or transmitted data and/or executable program instructions. The memory 430 may also be configured to store any form of beamforming information, reference signals, and/or feedback data or information. The memory 430 may be any suitable type of computer readable memory and may be of volatile and/or non-volatile type.

The eNodeB 401 may further comprise further comprises a network interface 440 and processing circuitry 420 which may be configured to generate and analyze reference signals, and generate beamformed communications which may be compensated for received power differences. The processing circuitry 420 may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

Example Node Operations

Figure 9:
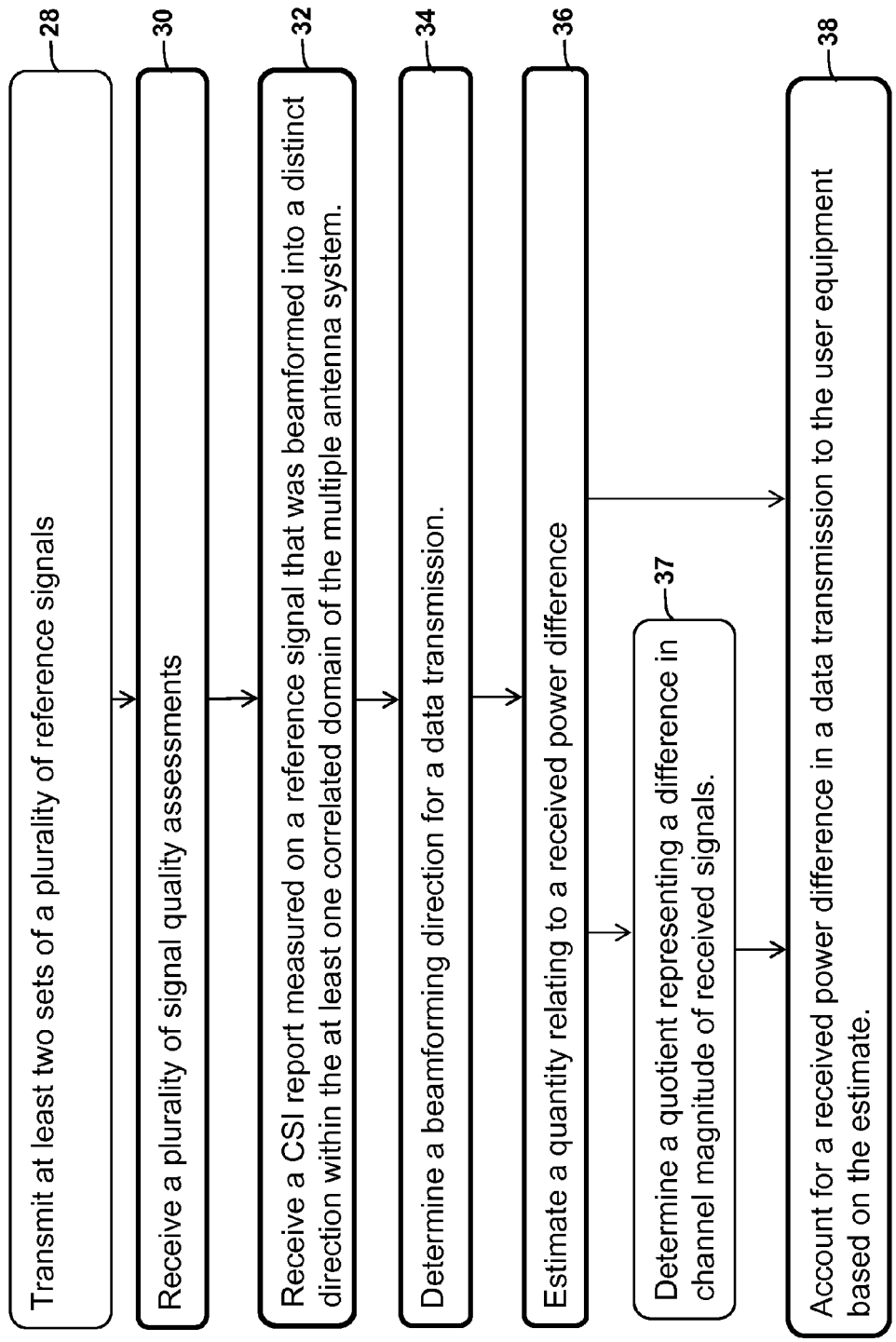
FIG. 9 is a flow diagram of example operations which may be taken by the eNodeB of FIG. 8, according to some of the example embodiments.

FIG. 9 is a flow diagram depicting example operations which may be taken by the eNodeB of FIG. 8, during data transmission in a multiple antenna system, according to some of the example embodiments. The example embodiments illustrated in the flow diagram are mainly explained under the subheading entitled "Refined Use of the Received CSI-RSRP Beamforming Feedback". Some portions of the example embodiments illustrated in FIG. 9 are also explained under the subheading entitled "Generating Beamforming from CSI-RSRP Feedback".

It should also be appreciated that FIG. 9 comprises some operations which are illustrated with a darker boarder and some operations which are illustrated with a lighter boarder. The operations which are comprised in a darker boarder are operations which are comprised in the broadest example embodiment. The operations which are comprised in a lighter boarder are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Example Operation 28

The eNodeB may be configured to transmit 28 at least two sets of a plurality of reference signals. Each reference signal may be beamformed into a distinct direction within at least one correlated domain. The radio circuitry 410 may be configured to transmit the at least two sets of the plurality of reference signals.

According to some of the example embodiments, the reference signals may be CSI-RS reference signals. According to some of the example embodiments the at least one correlated domain may be an elevation and/or an azimuth domain. As explained under the subheading "Refined Use of the Received CSI-RSRP Beamforming Feedback" at least one set of the plurality of reference signals may be a (elevation) CSI-RS set and/or a (traditional) CSI-RS set. It should be appreciated that a (azimuth) CSI-RS set may also be utilized.

Operation 30

The eNodeB is configured to receive 30, from a user equipment, a plurality of signal quality assessments. Each signal quality assessment corresponds to a signal quality level for a distinct direction within at least one correlated domain of the multiple antenna system. The radio circuitry 410 is configured to receive, from the user equipment, the plurality of signal quality assessments.

According to some of the example embodiments, at least one of the signal quality assessments may be a RSRP, RSRQ, or a RSSI. According to some of the example embodiments, the signal quality assessments may be received via CQI feedback messaging. According to some of the example embodiments, the at least one correlated domain may be an elevation and/or azimuth domain.

According to some of the example embodiments, the received signal quality assessments received under this operational step may be provided by measurement taken by the user equipment with respect to the (elevation) CSI-RS, as explained under subheadings "Refined Use of the Received CSI-RSRP Beamforming Feedback" and "Generating Beamforming from CSI-RSRP Feedback".

Operation 32

The eNodeB is further configured to receive 32, from the user equipment, a CSI report measured on a reference signal that was beamformed into a distinct direction within the at least one correlated domain of the multiple antenna system. The radio circuitry 410 is configured to receive, from the user equipment, the CSI report measured on the reference signal that was beamformed into a distinct direction within the at least one correlated domain.

According to some of the example embodiments, the reference signals may be CSI-RS signals. According to some of the example embodiments the CSI report may be provided by measurements taken by the user equipment based on the (traditional) CSI-RS, as explained under the subheading "Refined Use of the Received CSI-RSRP Beamforming Feedback".

Operation 34

The eNodeB is further configured to determine 34 a beamforming direction for a data transmission to the user equipment based in-part on the plurality of signal quality assessments. The processing circuitry 420 is configured to determine 34 the beamforming direction for the data transmission to the user equipment based in-part on the plurality of signal quality assessments. According to some of the example embodiments, the determination of the beamforming direction may be provided as explained under the subheading "Generating Beamforming from CSI-RSRP Feedback".

Operation 36

The eNodeB is further configured to estimate 36 a quantity relating to a received power difference between a transmission beamformed as the CSI reference signal and a signal beamformed in the determined beamformed direction. The estimating is based, at least in part, on the plurality of signal quality assessments. The processing node 420 is configured to estimate the quantity relating to the received power difference.

According to some of the example embodiments, a first set of a plurality of reference signals (e.g., (elevation) CSI-RS) may be used for the determining 34 and a second set of the plurality of reference signals (e.g., (traditional) CSI-RS) may be used for the estimating 36 (where the transmission of the plurality of reference signals is further described in relation to example operation 28), as is explained under the subheading "Refined Use of the Received CSI-RSRP Beamforming Feedback". It should further be appreciated that the first set and the second set of the plurality of reference signals may comprise an unequal number of ports.

Example Operation 37

According to some of the example embodiments, the estimating 36 may further comprise determining 37 a quotient representing a difference in channel magnitude of the transmission beamformed as the CSI reference signal and the signal beamformed in the determined beamforming direction. The processing circuitry 420 is configured to determine the quotient representing the difference in channel magnitude of the transmission beamformed as the CSI reference signal and the signal beamformed in the determined beamforming direction.

According to some of the example embodiments, the quotient may be provided by RSRP measurements provided by (elevation) CSI-RS and (traditional) CSI-RS, as explained under the subheading "Refined Use of the Received CSI-RSRP Beamforming Feedback".

Operation 38

The eNodeB is further configured to account 38 for the received power difference in the data transmission to the user equipment based on the estimating 36. The processing circuitry 420 is configured to account for the received power difference in the data transmission to the user equipment based on the estimating.

According to some of the example embodiments, the accounting may be done, at least in part, by modifying a recommended CQI, received as part of the CSI report, based on the estimated quantity relating to the received power difference.

According to some of the example embodiments, the accounting may be done, at least in part, by configuring the user equipment to apply a power measurement offset, when determining the CSI report, which comprises the estimated received power difference. According to some of the example embodiments, the account may be provided as explained under the subheading "Refined Use of the Received CSI-RSRP Beamforming Feedback".

Conclusion

It should be noted that although terminology from 3GPP LTE has been used herein to explain the example embodiments, this should not be seen as limiting the scope of the example embodiments to only the aforementioned system. Other wireless systems, including WCDMA, WiMax, UMB and GSM, may also benefit from the example embodiments disclosed herein.

Also note that terminology such as eNodeB and user equipment should be considered as non-limiting and does in particular not imply a certain hierarchical relation between the two. In general "eNodeB" could be considered as device 1 and "user equipment" as device 2, and these two devices communicate with each other over some radio channel. Furthermore, while the example embodiments focus on wireless transmissions in the downlink, it should be appreciated that the example embodiments are equally applicable in the uplink.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, beacon device, or repeater. A radio node herein may comprise a radio node operating in one or more frequencies or frequency bands. It may be a radio node capable of CA. It may also be a single- or muti-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments.

Accordingly, although specific terms are employed, they are used in a generic and descriptive sense only and not for purposes of limitation, the scope of the embodiments being defined by the following claims.

The invention claimed is:

1. A method, in an eNodeB, for data transmission in a multiple antenna system, the eNodeB being comprised in a wireless communications network, the method comprising:
   receiving, from a user equipment, a plurality of signal quality assessments, wherein each signal quality assessment corresponds to a signal quality level for a distinct direction within at least one correlated domain of the multiple antenna system;
   receiving, from the user equipment, a Channel State Information, CSI, report measured on a reference signal that was beamformed into a distinct direction within the at least one correlated domain of the multiple antenna system;
   determining a beamforming direction for a data transmission to the user equipment based in-part on the plurality of signal quality assessments;
   estimating a quantity relating to a received power difference between a transmission beamformed as said CSI reference signal and a signal beamformed in said determined beamforming direction, based, at least in part, on said plurality of signal quality assessments; and
   accounting for the received power difference in the data transmission to the user equipment based on the estimating.

2. The method of claim 1, wherein at least one of the signal quality assessments is a reference signal received power, RSRP, a reference signal received quality, RSRQ, or a received signal strength indicator, RSSI.

3. The method of claim 1, wherein the at least one correlated domain is an elevation and/or azimuth domain.

4. The method of claim 1, wherein the accounting is done, at least in part, by modifying a recommended Channel Quality Indicator, CQI, received as part of the CSI report, based on the estimated quantity relating to the received power difference.

5. The method of claim 1, wherein the accounting is done, at least in part, by configuring said user equipment to apply a power measurement offset, when determining said CSI report, which comprises said estimated received power difference.

6. The method of claim 1, further comprising transmitting at least two sets of a plurality of reference signals, each reference signal being beamformed into a distinct direction within the at least one correlated domain.

7. The method of claim 6, wherein a first set of a plurality of reference signals, of the at least two sets, is utilized in the determining and a second set of a plurality of reference signals, of the at least two sets, is utilized for the estimating.

8. The method of claim 1, wherein the reference signal and/or the plurality of reference signals are a Channel State Information Reference Symbols, CSI-RS.

9. The method of claim 5, wherein the first set of and the second set of the plurality of reference signals comprise an unequal number of ports.

10. The method of claim 1, wherein the signal quality assessments are received via Channel Quality Indicator, CQI, feedback messaging.

11. The method of claim 1, wherein the estimating further comprises determining a quotient representing a difference in channel magnitude of the transmission beamformed as said CSI reference signal and the signal beamformed in said determined beamforming direction.

12. An eNodeB, for data transmission in a multiple antenna system, the eNodeB being comprised in a wireless communications network, the eNodeB comprising:
   radio circuitry configured to receive, from a user equipment, a plurality of signal quality assessments, wherein each signal quality assessment corresponds to a signal quality level for a distinct direction within at least one correlated domain of the multiple antenna system;
   the radio circuitry further configured to receive, from the user equipment, a Channel State Information, CSI, report measured on a reference signal that was beamformed into a distinct direction within the at least one correlated domain of the multiple antenna system;
   processing circuitry configured to determine a beamforming direction for a data transmission to the user equipment based in-part on the plurality of signal quality assessments;
   processing circuitry further configured to estimate a quantity relating to a received power difference between a transmission beamformed as said CSI reference signal and a signal beamformed in said determined beamforming direction, based, at least in part, on said plurality of signal quality assessments; and
   processing circuitry configured to account for the received power difference in the data transmission to the user equipment based on the estimating.

13. The eNodeB of claim 12, wherein at least one of the signal quality assessments is a reference signal received power, RSRP, a reference signal received quality, RSRQ, or a received signal strength indicator, RSSI.

14. The eNodeB of claim 12, wherein the at least one correlated domain is an elevation and/or azimuth domain.

15. The eNodeB of claim 12, wherein the processing circuitry is further configured to account for the received power difference, at least in part, by modifying a recommended Channel Quality Indicator, CQI, received as part of the CSI report, based on the estimated quantity relating to a received power difference.

16. The eNodeB of claim 12, wherein the processing circuitry is further configured to account for the received power difference, at least in part, by configuring the user equipment to apply a power measurement offset, when determining the CSI report, which comprises the estimated received power difference.

17. The eNodeB of claim 12, wherein the radio circuitry is further configured to transmit at least two sets of a plurality of reference signals, each reference signal being beamformed into a distinct direction within the at least one correlated domain.

18. The eNodeB of claim 17, wherein a first set of a plurality of reference signals, of the at least two sets, is utilized in the determination of the beamforming direction and a second set of a plurality of reference signals, of the at least two sets, is utilized for the estimation of the quantity relating to a received power difference.

19. The eNodeB of claim 12, wherein the reference signal and/or the plurality of reference signals are a Channel State Information Reference Symbols, CSI-RS.

20. The eNodeB of claim 18, wherein the first set of and the second set of the plurality of reference signals comprise an unequal number of ports.

21. The eNodeB of claim 12, wherein the signal quality assessments are received via Channel Quality Indicator, CQI, feedback messaging.

22. The eNodeB of claim 12, wherein the processing circuitry is further configured to estimate the quantity relating to a received power difference by determining a quotient representing a difference in channel magnitude of the transmission beamformed as said CSI reference signal and the signal beamformed in said determined beamforming direction.

* * * * *